(12) United States Patent
Kondo

(10) Patent No.: US 11,168,640 B2
(45) Date of Patent: Nov. 9, 2021

(54) FUEL INJECTION CONTROL DEVICE

(71) Applicant: DENSO CORPORATION, Kariya (JP)

(72) Inventor: Takahiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/983,746

(22) Filed: Aug. 3, 2020

(65) Prior Publication Data
US 2020/0362789 A1     Nov. 19, 2020

Related U.S. Application Data

(63) Continuation of application No. PCT/JP2019/003187, filed on Jan. 30, 2019.

(30) Foreign Application Priority Data

Feb. 6, 2018 (JP) .............................. JP2018-019653

(51) Int. Cl.
*F02D 41/40* (2006.01)
*F02D 41/00* (2006.01)
(Continued)

(52) U.S. Cl.
CPC ......... *F02D 41/402* (2013.01); *F02D 41/009* (2013.01); *F02D 41/1444* (2013.01);
(Continued)

(58) Field of Classification Search
CPC .. F02D 41/402; F02D 41/009; F02D 41/1444; F02D 41/345; F02D 2041/389;
(Continued)

(56) References Cited

U.S. PATENT DOCUMENTS

| | | | | | |
|---|---|---|---|---|---|
| 5,526,797 A | * | 6/1996 | Stokes | ................ | F02D 19/0668 123/575 |
| 6,173,690 B1 | * | 1/2001 | Iriya | .................... | F02B 31/085 123/295 |

(Continued)

FOREIGN PATENT DOCUMENTS

| EP | 1245816 A2 * | 10/2002 | ......... F02D 41/0255 |
|---|---|---|---|
| JP | 2012159005 A | 8/2012 | |

(Continued)

*Primary Examiner* — Joseph J Dallo
(74) *Attorney, Agent, or Firm* — Harness, Dickey & Pierce, P.L.C.

(57) ABSTRACT

A timing setting section sets a fuel injection timing in a second half of a compression stroke of an internal combustion engine, at a predetermined computation timing, which is set for each combustion cycle of the internal combustion engine, when an amount of a reduction target component in exhaust gas detected by an exhaust gas sensor is greater than or equal to a predetermined value, on condition that the internal combustion engine satisfies a predetermined high temperature condition. The fuel injection control device further includes an injection control unit to compute a fuel injection period based on the injection timing set by the timing set unit and to control the fuel injection valve based on the injection timing and the injection period.

12 Claims, 4 Drawing Sheets

(51) Int. Cl.
  *F02D 41/14* (2006.01)
  *F02D 41/34* (2006.01)
  *F02M 55/02* (2006.01)
  *F02D 41/38* (2006.01)

(52) U.S. Cl.
  CPC ........... F02D 41/345 (2013.01); F02M 55/02 (2013.01); *F02D 2041/389* (2013.01); *F02D 2200/0602* (2013.01)

(58) Field of Classification Search
  CPC ......... F02D 2200/0602; F02D 41/0245; F02D 41/1466; F02D 41/1454; F02D 41/3845; F02D 41/3094; F02M 55/02; Y02T 10/12; Y02T 10/40
  See application file for complete search history.

(56) References Cited

U.S. PATENT DOCUMENTS

| | | | |
|---|---|---|---|
| 2001/0027644 A1* | 10/2001 | Iihoshi | F02D 41/024 60/285 |
| 2005/0133001 A1* | 6/2005 | Kaneko | F02B 51/02 123/299 |
| 2008/0208438 A1* | 8/2008 | Sukegawa | F02D 41/401 701/105 |
| 2009/0044517 A1* | 2/2009 | Oba | F01N 3/106 60/285 |
| 2016/0169148 A1* | 6/2016 | Yokoi | F02P 5/1506 123/299 |
| 2016/0356230 A1* | 12/2016 | Watanabe | F02D 41/06 |
| 2019/0063363 A1* | 2/2019 | Ogata | F02D 41/34 |

FOREIGN PATENT DOCUMENTS

| | | |
|---|---|---|
| JP | 2015014236 A | 1/2015 |
| JP | 2016223412 A | 12/2016 |

* cited by examiner

FUEL INJECTION CONTROL DEVICE

CROSS REFERENCE TO RELATED APPLICATION

The present application is a continuation application of International Patent Application No. PCT/JP2019/003187 filed on Jan. 30, 2019, which designated the U.S. and claims the benefit of priority from Japanese Patent Application No. 2018-019653 filed on Feb. 6, 2018. The entire disclosures of all of the above applications are incorporated herein by reference.

TECHNICAL FIELD

The present disclosure relates to a fuel injection control device configured to inject fuel to an internal combustion engine.

BACKGROUND

A fuel injection control device controls an injection state of fuel injected from a fuel injection valve to an internal combustion engine in order to promote a combustion efficiency of the internal combustion engine and to reduce harmful components such as particulate matter (PM) and NOx contained in exhaust gas from the internal combustion engine.

SUMMARY

According to an aspect of the present disclosure, a fuel injection control device controls a fuel injection system and includes: an accumulator to store high-pressure fuel; a fuel injection valve for direct injection to directly inject high-pressure fuel in the pressure accumulator into a combustion chamber of an internal combustion engine; and an exhaust gas sensor to detect a component in exhaust gas from the internal combustion engine.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
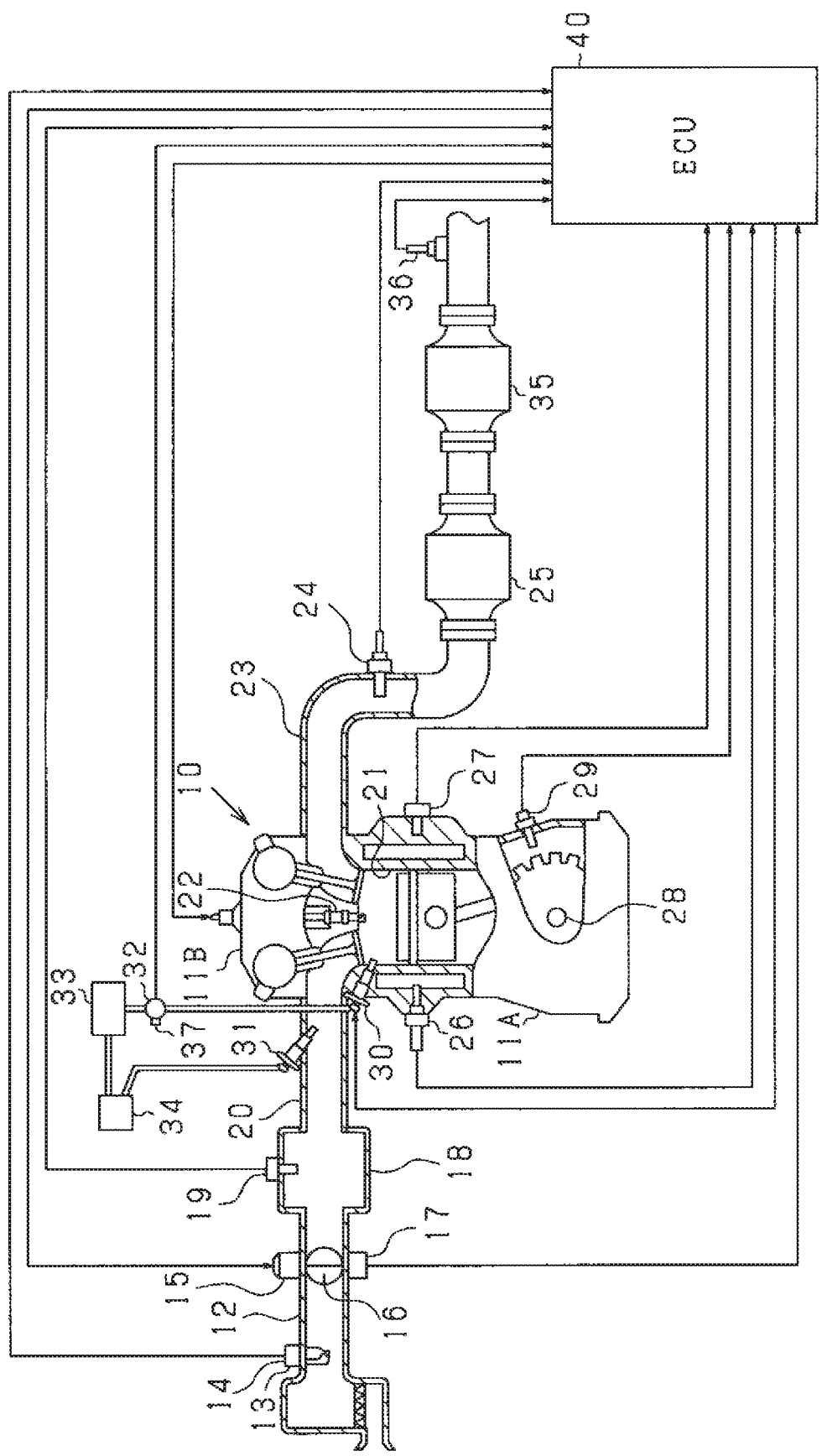
FIG. 1 is a schematic diagram showing a fuel injection system according to an embodiment.

As follows, examples of the present disclosure will be described.

According to an example of the present disclosure, a fuel injection control device controls an injection state of fuel injected from a fuel injection valve to an internal combustion engine in order to promote a combustion efficiency of the internal combustion engine and to reduce harmful components such as particulate matter (PM) and NOx contained in exhaust gas from the internal combustion engine.

According to another example of the present disclosure, a configuration may be employable to set a fuel injection period, which is defined by an injection start timing (SOI) of fuel and an injection end timing (EOI) of fuel, to agree with an injection period that enables to reduce PM and the like in an intake stroke of the internal combustion engine.

According to another example of the present disclosure, a configuration to implement fuel injection during the intake stroke of the internal combustion engine may be advantageous in order to reduce the PM in the exhaust gas of the internal combustion engine.

To the contrary, the person who discloses the present disclosure found out the followings as a result of earnest research. Specifically, in a case where fuel injection is implemented in a second half of a compression stroke of an internal combustion engine, injected fuel is, assumably, quickly evaporated in a combustion chamber of an internal combustion engine at high temperature, thereby to enhance a combustion state, and consequently to reduce components (harmful components such as PM and unburned fuel) in exhaust gas in some instances. Furthermore, the person who discloses the present disclosure found out that setting of a main injection timing of fuel in the second half of the compression stroke could reduce a reduction target component in exhaust rather than setting the main injection timing in the intake stroke in some instances depending on an operating state of the internal combustion engine.

It is estimatable whether to set the fuel injection timing in the intake stroke or in the second half of the compression stroke based on the operating condition of the internal combustion engine and the like to enable reduction of the reduction target component in the exhaust gas. That is, for each operating condition of the internal combustion engine, a more appropriate injection pattern may be adapted in advance. Setting of the injection pattern based on the operating condition enables to keep, to some extent, the reduction target component amount in exhaust gas within an appropriate numerical range.

On the other hand, in a case where fuel is injected in the second half of the compression stroke, a time period from injection of fuel to the combustion chamber of the internal combustion engine until the fuel is ignited is shortened. Consequently, the reduction target component amount in exhaust gas may increase depending on the condition of the combustion chamber.

According an example of the present disclosure, a fuel injection control device to control a fuel injection system includes: an accumulator to store high-pressure fuel; a fuel injection valve for direct injection to directly inject high-pressure fuel in the pressure accumulator into a combustion chamber of an internal combustion engine; and an exhaust gas sensor to detect a component in exhaust gas from the internal combustion engine. This fuel injection control device includes a timing set unit configured to set a fuel injection timing in a second half of a compression stroke of the internal combustion engine, when a component amount of a reduction target component in exhaust gas detected by the exhaust gas sensor is greater than or equal to a predetermined value, on condition that the internal combustion engine satisfies a predetermined high temperature condition at a predetermined computation timing that is set for each combustion cycle of the internal combustion engine. This fuel injection control device further includes an injection control unit configured to compute an injection period of fuel based on the injection timing that is set by the timing set unit and to control the fuel injection valve based on the injection timing and the injection period.

According to the example of the present disclosure, the injection timing is set in the second half of the compression stroke, on condition that the internal combustion engine satisfies the predetermined high temperature condition, when the component amount of the reduction target component in the exhaust gas detected by the exhaust gas sensor is greater than or equal to the predetermined value, that is, desirably to perform an operation to reduce the reduction target component. This configuration sets, as the condition that the internal combustion engine satisfies the predetermined high temperature condition, the condition to implement injection in the second half of the compression stroke, thereby to enable to avoid implementation of fuel injection in the second half of the compression stroke in a case where the reduction target component in exhaust rather increases due to implementation of fuel injection in the second half of the compression stroke.

As shown in FIG. 1, a fuel injection system 1 is a system configured to inject high-pressure fuel stored in a pressure accumulator 32 from a direct injection fuel injection valve 30 into a combustion chamber of an internal combustion engine 10. The internal combustion engine 10 is a multi-cylinder engine of an in-cylinder injection type that implements an intake stroke, a compression stroke, a combustion stroke, and an exhaust stroke as one combustion cycle. The pressure accumulator 32 is a delivery pipe and stores high-pressure fuel that is pressure-fed from a high-pressure pump 33. A low-pressure pump 34 supplies fuel from a fuel tank (not shown) to the high-pressure pump 33. A fuel pressure sensor 37 is provided to detect pressure (fuel pressure) of fuel in the accumulator 32.

The fuel injection system 1 further includes a port injection valve 31 that injects fuel into an intake port 20 of the internal combustion engine 10. Fuel is directly supplied to the port injection valve 31 from the low-pressure pump 34 without passing through the high-pressure pump 33.

An intake air flow rate sensor 13, which is to detect a flow rate of intake air, and an intake air temperature sensor 14 are provided on the upstream side of an intake pipe 12 of the internal combustion engine 10. A throttle valve 16, an opening of which is adjusted by using a motor 15, and a throttle opening sensor 17, which detects the opening (throttle opening) of the throttle valve 16, are provided on the downstream side thereof.

A surge tank 18 is provided on the downstream side of the throttle valve 16, and an intake pipe pressure sensor 19, which detects pressure in the intake pipe, is provided in the surge tank 18. The intake port 20 for introducing air into a combustion chamber 21 of each cylinder of the internal combustion engine 10 is connected to the surge tank 18. An electromagnetic fuel injection valve 30 that directly injects fuel into the combustion chamber 21 of respective one of cylinders of the internal combustion engine 10 is attached to the cylinder. A ignition plug 22 (an example of an ignition mechanism) is attached to a cylinder head 11B of respective one of the cylinders, and the air-fuel mixture in the combustion chamber 21 is ignited by using spark discharge of the ignition plug 22 of the cylinder.

An exhaust pipe 23 of the internal combustion engine 10 is provided with an A/F sensor 24 that detects an air-fuel ratio of exhaust gas. A catalyst layer 25 and a particle removal layer 35 are provided on the downstream side of the A/F sensor 24. The catalyst layer 25 is a layer including an exhaust purification catalyst such as a three-way catalyst (3-way catalyst). The particle removal layer 35 is a layer that removes mainly particulate matter in exhaust gas. The particle removal layer 35 is, for example, a gasoline particulate filter (GPF) and a 4-way-GPF in which a catalyst is carried on the GPF. A PM sensor 36 that detects the concentration of particulate matter (PM) in the exhaust gas is provided on the downstream side of the particle removal layer 35. The A/F sensor 24 and the PM sensor 36 are examples of an exhaust gas sensor that detects an amount of a predetermined component contained in exhaust gas. A NOx sensor, an O2 sensor, and/or the like may be used instead of or in addition to the A/F sensor 24 and the PM sensor 36.

A water temperature sensor 26 that detects a cooling water temperature and a knock sensor 27 that detects knocking are attached to a cylinder block 11A of the internal combustion engine 10. A crank angle sensor 29 that outputs a pulse signal at each time a crankshaft 28 rotates by a predetermined crank angle is attached to an outer peripheral side of the crankshaft 28. A crank angle and an engine rotation speed are detected based on a crank angle signal of the crank angle sensor 29. Further, the combustion chamber 21 may be provided with a fuel chamber pressure sensor that detects a pressure in the combustion chamber 21 and a combustion chamber temperature sensor that detects the temperature in the combustion chamber 21.

The outputs of those various sensors are input to an ECU 40. The ECU 40 is an electronic control unit mainly including a microcomputer and implements various controls of the internal combustion engine 10 by using detection signals of the various sensors. The ECU 40 computes a fuel injection amount according to an engine operation state of the internal combustion engine 10 to control fuel injection of the fuel injection valve 30 and to control an ignition timing of the ignition plug 22.

Figure 2:
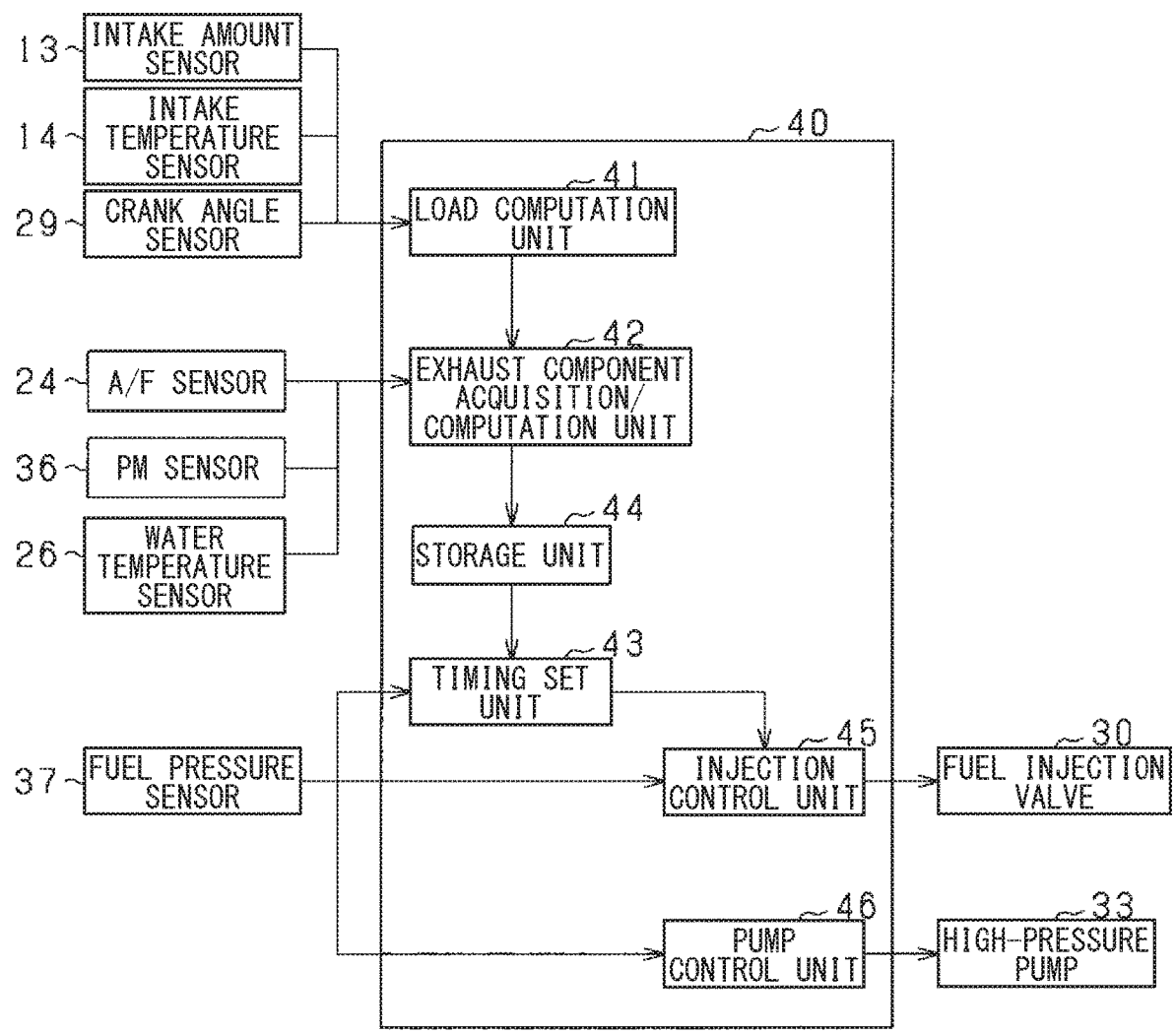
FIG. 2 is a system block diagram showing an ECU that is a fuel injection control device according to the embodiment.

As shown in FIG. 2, the ECU 40 includes a load computation unit 41, an exhaust gas component acquisition and computation unit 42, a timing set unit 43, a storage unit 44, an injection control unit 45, and a pump control unit 46.

The load computation unit 41 computes an operating load and a rotation speed of the internal combustion engine 10 based on detection values of the intake air flow sensor 13, the intake air temperature sensor 14, and the crank angle sensor 29. The detection values of the various sensors acquired by using the load computation unit 41, the computed operating load, and the computed rotation speed are output to the exhaust component acquisition and computation unit 42.

The exhaust gas component acquisition and computation unit 42 acquires the detection values of the A/F sensor 24, the PM sensor 36, and the water temperature sensor 26, and computes an amount of a predetermined component contained in exhaust gas. The predetermined component to be computed is a reduction target component that is preferably reduced in exhaust gas. Specifically, the predetermined component is, for examples, unburned fuel, components such as oxygen that are indicators of the combustion state (the lower the component amount, the better the combustion state), particulate matter, harmful components such as NOx, and the like. The detection values of the various sensors acquired by the exhaust gas component acquisition and computation unit 42 and the computed component amount of the predetermined component in exhaust gas are output to the storage unit 44 together with the data input from the load computation unit 41.

The storage unit 44 stores the operating load and the rotation speed of the internal combustion engine 10 computed by the load computation unit 41 and a component amount of the predetermined component contained in exhaust gas computed by the exhaust gas component acquisition and computation unit 42. More specifically, the storage unit 44 stores, as a map or a formula, a relationship between the timing of actual fuel injection (injection implementation timing) and the component amount of the reduction target component contained in exhaust gas at the same time for each of the operation load and the rotation speed of the internal combustion engine 10.

For example, the storage unit 44 stores, as a first component amount, the component amount of the reduction target component in exhaust gas when the injection implementation timing is in the second half of the compression stroke. For example, the storage unit 44 stores, as the second component amount, the component amount of the reduction target component in exhaust gas when the injection implementation timing is in the intake stroke or in the first half of the compression stroke.

The timing set unit 43 determines the injection timing of fuel injected from the fuel injection valve 30 and the port injection valve 31 at a predetermined computation timing set for each combustion cycle of the internal combustion engine 10. More specifically, the timing set unit 43 determines whether to set the injection timing in the second half of the compression stroke of the internal combustion engine 10 based on the operating condition of the internal combustion engine 10 computed by the load computation unit 41, an operating history, and the detection values of sensors 50. The timing set unit 43 may set the ignition timing of fuel according to the injection timing.

Figure 3:
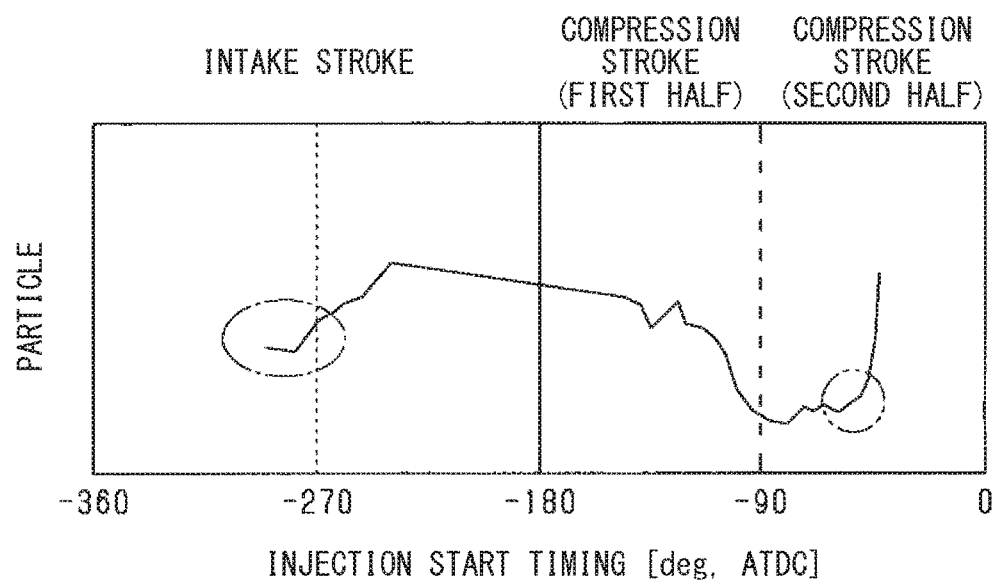
FIG. 3 is a view showing a relationship between an injection start timing of fuel to an internal combustion engine and a number of particles in exhaust gas.
Figure 4:
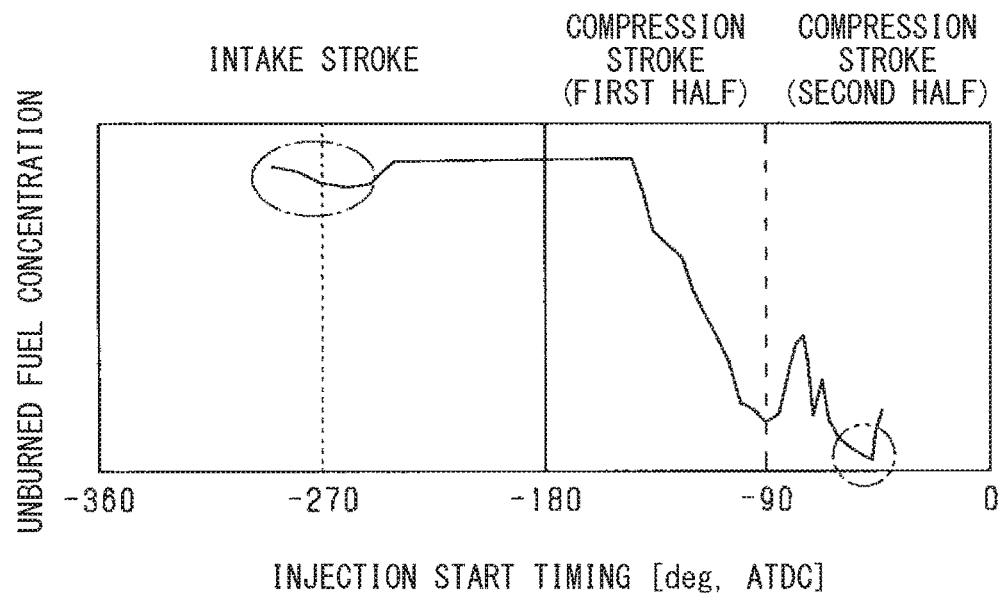
FIG. 4 is a view showing the injection start timing of fuel to the internal combustion engine and a concentration of unburned fuel in exhaust gas.

As shown in FIGS. 3 and 4, when the fuel injection timing is in the intake stroke of the internal combustion engine 10 and in the second half of the compression stroke, the number of particles and the unburned fuel amount in exhaust gas of the internal combustion engine 10 are low. When the fuel injection is implemented in the second half of the compression stroke of the internal combustion engine 10, fuel injected in the high temperature combustion chamber 21 is quickly vaporized, and thereby to presumably enable to improve the combustion state to enable to reduce harmful components in exhaust gas. Whether the fuel injection timing is set in the intake stroke or the second half of the compression stroke to further reduce the reduction target component in exhaust depends on the operating state of the internal combustion engine 10.

The timing set unit 43 determines whether or not the inside of the combustion chamber 21 of the internal combustion engine 10 satisfies a predetermined high temperature condition based on the load and the rotation speed of the internal combustion engine 10, the detection values of the sensors 50, and the like. On determination that the inside of the combustion chamber 21 satisfies the predetermined high temperature condition, the timing set unit 43 sets the injection timing in the second half of the compression stroke of the internal combustion engine 10. It should be noted that the predetermined high temperature condition is a condition in which the inside of the combustion chamber 21 is in a high temperature state in the second half of the compression stroke so that the amount of the reduction target component becomes less than a predetermined value. The predetermined high temperature condition may be set based on the operation history of the internal combustion engine 10 or an operation history acquired on another internal combustion engine having an equivalent structure to that of the internal combustion engine 10.

The timing set unit 43 refers to a map or the like stored in the ECU 40 and determines whether or not the predetermined high temperature condition is satisfied. The ECU 40 stores a map or a mathematical equation. The map or the mathematical equation associates the operating condition of the internal combustion engine 10, the detection values of the sensors 50, and various parameters computed from the detection values to the temperature and the pressure in the internal combustion engine 10 in the second half of the compression stroke and the component amount of the reduction target component. A predetermined numerical range that satisfies the high temperature condition may be set based on the map or the equation stored in the ECU 40 for each of the operating condition of the internal combustion engine 10, the detection values of the sensors 50, and the various parameters computed from the detection values.

The timing set unit 43 may determine that the inside of the combustion chamber 21 satisfies the predetermined high temperature condition in a case where the detection values are respectively within predetermined numerical ranges which are set appropriately. The detection values are, for example, the intake air temperature detected by the intake air temperature sensor 14, the cooling water temperature of the internal combustion engine 10 detected by the water temperature sensor 26, the rotation speed of the internal combustion engine 10 and the load of the internal combustion engine 10 computed from the detection value of the crank angle sensor 29, and the fuel pressure detected by the fuel pressure sensor 37.

Alternatively, the fuel injection system 1 may be configured to detect or compute a compression ratio, an internal EGR (exhaust gas recirculation) amount, an external EGR amount, an external EGR temperature, and the like. In this case, the timing set unit 43 may determine that the inside of the combustion chamber 21 satisfies the predetermined high temperature condition in a case where those detections values are respectively within numerical ranges which are set appropriately. The compression ratio and the internal EGR amount may be computed from control amounts of an intake variable valve timing mechanism (VCT), an intake variable valve lift mechanism (VVL), and a variable compression ratio mechanism (VCR). The external EGR amount and the external EGR temperature may be detected by using a flow rate sensor and a temperature sensor installed in an external EGR pipe through which exhaust gas flows from the exhaust system into the intake system of the internal combustion engine 10.

The timing set unit 43 may be further configured to set the fuel injection timing in the second half of the compression stroke of the internal combustion engine 10 on condition that the fuel pressure in the pressure accumulator 32 detected by the fuel pressure sensor 37 is equal to or higher than a predetermined value. This configuration enables to restrict injection of fuel at a low fuel pressure and thereby to restrict increase in the component amount of the reduction target component (for example, PM and unburned fuel) in exhaust gas due to enlarged droplets of fuel and insufficient vaporization.

In a configuration in which the injection timing is set in the second half of the compression stroke, the timing set unit 43 may set an optimum injection timing that enables to further reduce the component amount of the reduction target component in exhaust gas and to reduce the fuel consumption.

More specifically, for example, in a configuration to perform homogeneous combustion, the temperature in the combustion chamber 21 is raised as much as possible by compressing the volume of the combustion chamber. Further, in order to promote atomization of fuel, the injection timing is retarded as much as possible within a range where homogeneity can be ensured in the combustion chamber 21. In a case where the injection timing is retarded excessively, fuel spray is deviated in the combustion chamber 21, which is reduced in volume, and therefore mixture (mixture of air and fuel) is hardly formed.

Further, for example, in the case of performing stratified charge combustion, the fuel injection timing is adjusted so that air-fuel mixture at a predetermined air-fuel ratio is formed near the ignition plug 22 at the fuel ignition timing set for each operating condition.

The timing set unit 43 may further set the injection implementation timing, in which the component amount of the reduction target component is small, as the injection implementation timing of the next combustion cycle, with reference to a map or the like stored in the storage unit 44. The map or the like defines a relationship between the injection implementation timing and the component amount of the reduction target component in exhaust gas.

For example, the timing set unit 43 refers a map or the like, which is stored in the storage unit 44 and defines the relationship between the injection implementation timing and the component amount of the reduction target component in exhaust gas, for the load and the rotation speed, which are set according to the operating load and the rotation speed of the internal combustion engine 10 computed by the load computation unit 41. The timing set unit 43 reads a component amount of the reduction target component (first component amount) in exhaust gas, when the injection implementation timing is in the second half of the compression stroke, and a component amount of the reduction target component (second component amount) in exhaust gas, when the injection implementation timing is in the intake stroke or the first half of the compression stroke, and compare the first component amount with the second component amount. When the first component amount is equal to or less than the second component amount (first component amount second component amount), the timing set unit 43 sets the injection timing to the second half of the compression stroke on condition that the inside of the combustion chamber 21 satisfies a predetermined high temperature condition. Conversely, when the first component amount exceeds the second component amount (first component amount>second component amount), the timing set unit 43 sets the injection timing in the intake stroke or the first half of the compression stroke.

The determination based on the relationship between the injection implementation timing and the component amount of the reduction target component in exhaust stored in the storage unit 44 may be executed prior to or after the determination of whether or not the inside of the combustion chamber 21 satisfies the predetermined high temperature condition.

The timing set unit 43, as necessary, determines whether to implement the multiple split injections during one combustion cycle of the internal combustion engine 10 and sets the injection timing of each injection in the split injections. In this case, it is preferable to set the injection timing of the last injection at the end of the multiple split injections to be performed in the second half of the compression stroke of the internal combustion engine 10. The split injection may be performed for the purpose of, for example, assisting ignition of fuel or introducing an air layer between the injections of fuel into the combustion chamber 21.

When implementing the split injection, fuel may be injected by using only the fuel injection valve 30, or fuel may be injected by using the fuel injection valve 30 and the port injection valve 31 in combination. In the latter case, the injection start timing of the port injection valve 31 is preferably set in a period from the intake valve of the internal combustion engine 10 is closed in the combustion cycle of the internal combustion engine 10 immediately before to the end of the intake stroke of the present combustion cycle of the internal combustion engine 10. The injection start timing of the fuel injection valve 30 is preferably set in the second half of the compression stroke of the present combustion cycle of the internal combustion engine 10.

It is preferable that the timing set unit 43 sets the injection timing of the injection, which is implemented at the end of among the multiple split injections during one combustion cycle of the internal combustion engine 10, in the second half of the compression stroke of the internal combustion engine 10. Furthermore, it is further preferable to set the injection timing of the last injection implemented in the second half of the compression stroke of the internal combustion engine 10 and before the ignition of fuel so that a rich air-fuel mixture can be formed around the ignition plug 22 by the last injection.

The timing set unit 43 may reset the injection timing based on the detection values acquired from various sensors at the fuel injection timing. For example, the timing set unit 43 may set the injection timing in the second half of the compression stroke at a predetermined computation timing set for each combustion cycle of the internal combustion engine 10, and subsequently, may acquire the pressure and temperature in the combustion chamber 21, the component amount of the reduction target component in exhaust gas, and the like when the second half of the compression stroke is reached, and further may reset the previously set injection timing based on the detection values.

The timing set unit 43 may be configured to set a prohibition flag to prohibit fuel injection in the second half of the compression stroke of the internal combustion engine 10 based on a component amount of a predetermined component in exhaust gas acquired while the fuel injection is being performed in the second half of the compression stroke. More specifically, the timing set unit 43 sets the prohibition flag to prohibit fuel injection in the second half of the compression stroke of the internal combustion engine 10 on condition that a component amount of the predetermined component in exhaust gas, which is obtained by acquiring the detection values of the A/F sensor 24 and the PM sensor 36 in the second half of the compression stroke, or a component amount of a predetermined component in exhaust gas, which is computed by the acquisition and computation unit 42 based on these detection values, is equal to or more than a predetermined threshold value. The threshold value set for the amount of the predetermined component in exhaust gas may be mapped according to the injection timing, the temperature and pressure in the combustion chamber 21 of the internal combustion engine 10, and the rotational speed and the load of the internal combustion engine 10 and may be stored in a storage unit of the ECU 40.

The timing set unit 43 may set the prohibition flag when the injection control cannot be implemented accurately and therefore it is predicted that the amount of the predetermined component in exhaust gas will increase if the fuel injection is performed in the second half of the compression stroke. For example, the flag which prohibits fuel injection in the second half of the compression stroke may be set when an abnormality is detected in the fuel system, when a fail-safe control is executed, when the rotation speed of the internal combustion engine 10 is equal to or higher than a predetermined value and therefore the injection cannot be completed before the ignition timing, and the like.

The timing set unit 43 may permit fuel injection in the second half of the compression stroke when the components to be reduced in exhaust gas detected by the exhaust gas sensor exceeds a predetermined value in a case where fuel is injected from the fuel injection valve 30 into the combustion chamber 21 at a timing other than the second half of the compression stroke (for example, in the intake stroke or in the second half of the compression stroke). The prohibition flag may be cancelled instead of permitting the fuel injection in the second half of the compression stroke. Further, the timing set unit 43 may be configured to cancel the prohibition flag when the above-mentioned prohibition flag setting condition is no longer satisfied. Alternatively, a condition to cancel the prohibition flag may be provided separately from the condition to set the prohibition flag.

The timing set unit 43 may be configured to switch the injection mode based on the component amount of the reduction target component in exhaust gas detected during implementation of the fuel injection. For example, the injection mode (for example, a second half compression stroke injection mode) being implemented may be switched to another injection mode on condition that the detected amount of the reduction target component in exhaust gas is equal to or greater than a predetermined value. For example, the injection mode may be switched by setting and cancelling the prohibition flag.

The injection control unit 45 computes the fuel injection period based on the fuel injection timing, which is set by the timing set unit 43, and controls the fuel injection valve 30 or the port injection valve 31 based on the injection timing and the injection period to implement fuel injection. The fuel injection valve 30 is controlled so that fuel is injected in the second half of the compression stroke of the internal combustion engine 10 only when the injection timing is set by the timing set unit 43 in the second half of the compression stroke of the internal combustion engine 10.

The injection control unit 45 computes the injection period of combustion based on the start of the injection timing (injection start timing) set by the timing set unit 43, the fuel ignition timing, and the rotation speed of the internal combustion engine 10. The injection control unit 45 controls the fuel injection valve 30 or the port injection valve 31 based on the injection start timing and the injection period to inject fuel into the combustion chamber 21. When the prohibition flag is set by the timing set unit 43 and when the fuel injection is implemented in the second half of the compression stroke, the injection control unit 45 causes the fuel injection valve 30 or the port injection valve 31 to stop the injection.

The injection control unit 45 may further compute the fuel injection amount based on the fuel injection period and the fuel pressure. The computed injection amount may be mapped or mathematically associated with the reduction target component in exhaust gas and may be stored in the storage unit of the ECU 40.

The fuel injection amount in the second half of the compression stroke is preferably set to an optimum injection amount that enables further to reduce the component amount of the reduction target component in exhaust gas and to reduce fuel consumption. Specifically, it is preferable to set the injection amount as much as possible within a range where homogeneity in the combustion chamber 21 can be ensured. Alternatively, the injection amount may be set within a range in which a target value set for the component amount of the reduction target component in exhaust gas or fuel consumption (for example, a target value set according to a regulation value of the number of particles in exhaust gas) can be achieved.

Further, for example, when performing stratified charge combustion, the injection conditions such as the injection amount are preferably controlled so that the air-fuel mixture at a predetermined air-fuel ratio is formed in the vicinity of the ignition plug 22 at the ignition timing of fuel set for each operating condition.

Further, for example, for the purpose of reducing the injection amount of fuel immediately before ignition as much as possible to improve the robustness, the injection control unit 45 may reduce the injection amount of fuel in the second half of the compression stroke within a range in which the exhaust amount can be the target value.

When implementation of the split injection is determined by the timing set unit 43 and when the injection pattern of the split injection is set to perform injection in the second half of the compression stroke, the injection control unit 45 may compute the injection period, and in addition, may compute the injection amount for each injection.

The injection control unit 45 preferably controls the amount of fuel injected in each of multiple divided injections so that the amount of fuel injected in the second half of the compression stroke becomes larger than the amount of fuel injected in a stroke other than the second half of the compression stroke.

The injection control unit 45 may set the quantity of fuel injected in each of the multiple split injections, so that the amount of fuel injected in the second half of the compression stroke of the internal combustion engine 10 becomes greater than the amount of fuel injected in a stroke other than the second half of the compression stroke of the internal combustion engine 10, on condition that the component amount of the reduction target component in exhaust gas detected by the A/F sensor 24 or the PM sensor 36 is equal to or greater than a predetermined value.

In a case where the injection timing of the injection is set in the second half of the compression stroke and before the ignition of the fuel, it is preferable that the injection control unit 45 controls the injection condition of the injection that is implement last so that a rich air-fuel mixture is formed around the ignition plug 22 to cause stratified combustion.

When the timing set unit 43 resets the injection timing based on the detection values obtained from various sensors at the time of fuel injection, the injection control unit 45 may compute the injection period for the reset injection period, and in addition, may compute the injection amount.

The pump control unit 46 controls the output of the high-pressure pump 33 and the output of the low-pressure pump 34 based on the detection value of the fuel pressure sensor 37. The pump control unit 46 may be configured to set a target fuel pressure and to permit implementation of fuel injection on condition that the detection value of the fuel pressure sensor 37 becomes a value near the target fuel pressure. In a case where fuel is injected in the second half of the compression stroke, when the fuel pressure is low, droplets of injected fuel may develop and vaporization of fuel may become insufficient. Consequently, the combustion state may be degraded, and the component amount of the reduction target component in exhaust gas may be increased. Therefore, the target fuel pressure, when the injection timing is set in the second half of the compression stroke, is set higher than the target fuel pressure when the injection timing is set in another stroke such as the intake stroke. In addition, when the fuel pressure at the time of fuel injection is high, the initial velocity of fuel becomes faster, and the injected fuel droplets become smaller. Therefore, the number of collisions between air molecules and fuel droplets per unit time increases, thereby to enable fuel to diffuse preferably and to form mixture of fuel and air preferably.

Figure 5:
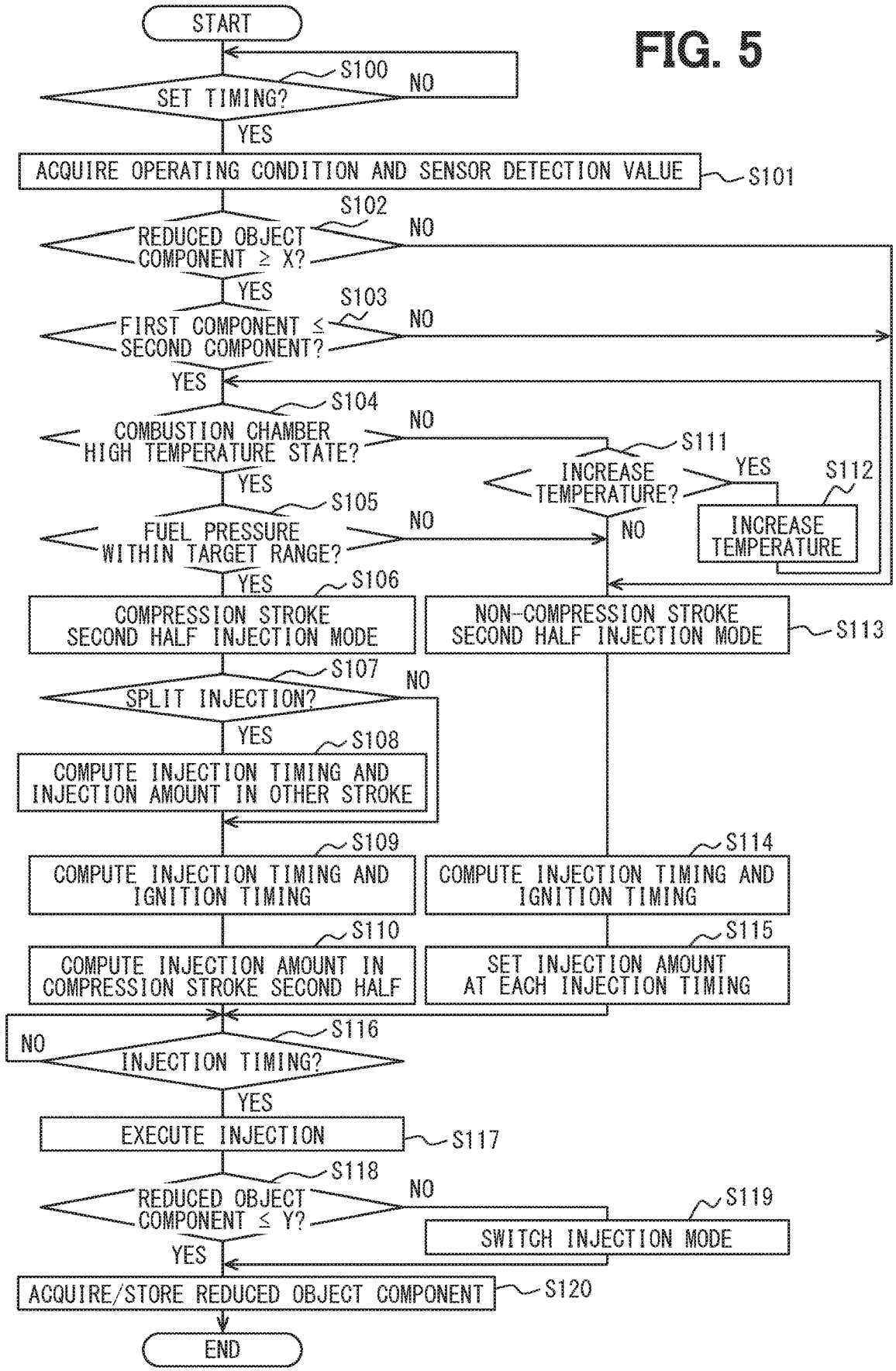
FIG. 5 is a flowchart showing a fuel injection control according to the embodiment.

The injection control process executed by the ECU 40 will be described with reference to the flowchart shown in FIG. 5. First, in step S100, it is determined whether or not it is a set timing such as an injection timing. This set timing is a predetermined computation timing set for each combustion cycle of the internal combustion engine 10.

When it is the set timing, the process proceeds to step S101 where the ECU 40 acquires the operating condition of the internal combustion engine 10 and sensor detection values from various sensors. Specifically, detection values, such as the load of the internal combustion engine 10, the detection value of an unburned fuel amount and the number of particles in exhaust gas detected by the A/F sensor 24 and the PM sensor 36, the cooling water temperature of the internal combustion engine 10 from the water temperature sensor 26, the intake air flow rate from the flow rate sensor 13, the intake air temperature from the intake air temperature sensor 14, and the temperature in the combustion chamber 21 based on the crank angle signal from the crank angle sensor 29, are acquired as necessary. In a case where a fuel chamber pressure sensor, a combustion chamber temperature sensor, and the like are installed, the detection values of the pressure and temperature in the combustion chamber 21 may be further acquired.

The process proceeds to step S102 where it is determined whether a component amount of a predetermined reduction target component (for example, PM or unburned fuel) in exhaust gas is equal to or more than a threshold value X. When the component amount of the predetermined reduction target component is less than the threshold value, the process proceeds to step S113 to determine to implement injection in an operation mode (non second half compression stroke injection mode) in which fuel injection is not implemented in the second half of the compression stroke. When the component amount of the predetermined reduction target component is equal to or more than the threshold value, the process proceeds to step S103.

In step S103, the first component amount and the second component amount stored in the ECU 40 are compared with each other to determine whether the first component amount is equal to or less than the second component amount (first component amount second component amount). The first component amount is the component amount of the reduction target component in exhaust gas when the injection implementation timing is in the second half of the compression stroke, and the second component amount is the amount of the reduction target component in the exhaust gas when the injection implementation timing is in the intake stroke or in the first half of the compression stroke. That is, the first component amount is a component amount of the reduction target component in exhaust gas detected when actual injection is implemented in the operation mode (second half compression stroke injection mode) in which fuel injection is implemented in the second half of the compression stroke. The second component amount is a component amount of the reduction target component in exhaust gas detected when the actual injection is performed in the non second half compression stroke injection mode. In a case where the first component amount>the second component amount, the process proceeds to step S113 where determination is made to perform the injection in the non second half compression stroke injection mode. When the first component amount the second component amount, the process proceeds to step S104.

In step S104, the ECU 40 determines whether or not the inside of the combustion chamber 21 satisfies the predetermined high temperature condition based on the acquired operating condition and the sensor detection values of the various sensors. Specifically, it is determined that the inside of the combustion chamber 21 satisfies the predetermined high temperature condition when the detection value, such as the intake air temperature detected by the intake air temperature sensor 14, the cooling water temperature of the internal combustion engine 10 detected by the water temperature sensor 26, the rotation speed or the load of the internal combustion engine 10 computed from the detection value of the crank angle sensor 29, the fuel pressure detected by the fuel pressure sensor 37, is within a predetermined numerical range that is set appropriately. When the inside of the combustion chamber 21 satisfies the predetermined high temperature condition, the process proceeds to step S105.

In step S104, when the inside of the combustion chamber 21 does not satisfy the predetermined high temperature condition, the process proceeds to step S111 where it is determined whether or not a high temperature process for the temperature inside the combustion chamber 21 is implemented. For example, when the internal combustion engine 10 is cold started, it is determined that the predetermined high temperature condition of step S104 is not satisfied, however, the high temperature process may be executed so as to satisfy the predetermined high temperature condition.

Specifically, the method of the high temperature process may include, for example, to increase the compression ratio of the variable compression ratio mechanism, to prohibit late closing and early closing of the intake VVT, to adjust intake temperature cooling to increase the intake temperature, to switch the cooling system of the internal combustion engine 10 to heat the combustion chamber 21 with cooling return water, to increase the internal EGR amount or the external EGR amount of the internal combustion engine 10, and the like. When the high temperature process is executed, the process returns from step S112 to step S104. When the high temperature process is not executed, the process proceeds from step S111 to step S113 to determine to implement injection in the non second half compression stroke injection mode.

In step S105, it is determined whether or not the fuel pressure in the pressure accumulator 32 acquired from the fuel pressure sensor 37 is within a predetermined range with respect to the target fuel pressure P1. Specifically, for example, it is determined whether or not $P1-\Delta P1 \leq P \leq P1+\Delta P1$. When the fuel pressure is within the predetermined range, the process proceeds to step S106 to determine to implement fuel injection in the second half of the compression stroke. That is, on the condition that the component amount of the reduction target component in exhaust gas is equal to or more than the threshold value X, that the measured first component amount is equal to or less than the second component amount, that the internal combustion engine 10 satisfies the predetermined high temperature condition suitable for fuel injection in the second half of the compression stroke, and that the fuel pressure in the pressure accumulator 32 is within the predetermined range with respect to the target fuel pressure, the ECU 40 employs the second half compression stroke injection mode and sets the fuel injection timing to the second half of the compression stroke of the internal combustion engine 10. When the fuel pressure in the pressure accumulator 32 is not within the predetermined range with respect to the target fuel pressure, the process proceeds to step S113 to determine to perform injection in the non second half compression stroke injection mode.

In steps S107 to S110, the process is executed to implement injection in the second half of the compression stroke injection mode. First, in step S107, it is determined whether or not injection is implemented in a stroke (for example, the intake stroke) other than the second half of the compression stroke. That is, it is determined whether or not the split injections are implemented. When injection is implemented in another stroke, the process proceeds to step S108 where the injection period and the injection amount are computed based on the set injection timing for fuel injection implemented in another stroke, and the process proceeds to step S109. When injection in another stroke is not implemented, the process directly proceeds from step S107 to step S109.

In step S109, the fuel injection timing and the ignition timing are computed. Specifically, the injection timing is computed based on the load of the internal combustion engine 10, the acquired detection values of the unburned fuel amount and the number of particles, with reference to the map of the injection timing and the injection amount stored in the ECU 40.

In a case where the port injection valve 31 is additionally used for fuel injection, the injection start timing of the port injection valve 31 is set to a period after the intake valve of the internal combustion engine 10 is closed in the combustion cycle of the internal combustion engine 10 immediately before and before the end of the intake stroke of the present combustion cycle of the internal combustion engine 10, and the injection start timing of the fuel injection valve 30 is set to the second half of the compression stroke of the current combustion cycle of the internal combustion engine 10.

Next, the process proceeds to step S110 where the fuel injection amount of fuel injection implemented in the second half of the compression stroke is computed. The injection period and the injection amount for the fuel injection performed in the second half of the compression stroke are computed based on the computed injection timing and the detection value of the fuel pressure.

In addition, when the component amount of the reduction target component in exhaust gas detected by the A/F sensor 24, the PM sensor 36 and the like is equal to or more than the predetermined value, the amount of fuel injected in the second half of the compression stroke of the internal combustion engine 10 may be set to be larger than the amount of fuel injected in a stroke other than the second half of the compression stroke of the internal combustion engine 10.

On the other hand, in steps S113 to S115, the process is executed to implement injection in the non second half compression stroke injection mode. In step S113, on determination to implement injection in the non second half compression stroke injection mode, subsequently, the process proceeds to steps S114 and S115 in this order to set the fuel injection timing, the fuel ignition timing, and the fuel injection amount at each injection timing. Thus, the process proceeds to step S116.

When it is determined in step S116 that the set injection timing has been reached, the process proceeds to step S117 where fuel injection is implemented, and the process proceeds to step S118. In step S118, it is determined whether the component amount of the reduction target component in exhaust gas is equal to or less than a predetermined threshold value Y. The process is performed immediately after step S117 where injection is implemented. Therefore, in step S118, the component amount of the reduction target component in exhaust gas acquired based on the detection values of the various sensors when the injection is performed is compared with the threshold Y.

When the component amount of the reduction target component exceeds the threshold value Y, the process proceeds to step S119 to determine to switch the injection mode. When the injection is being implemented in the second half compression stroke injection mode, it is determined to switch to the non second half compression stroke injection mode. When the injection is being implemented in the non second half compression stroke injection mode, it is determined to switch to the second half compression stroke injection mode. The injection mode may be switched by setting a flag that prohibits the injection mode that is being implemented.

The process proceeds from step S119 to step S120. Further, when the component amount of the reduction target component is equal to or less than the threshold value Y in step S118, the process proceeds to step S120. In step S120, the ECU 40 acquires and stores the detection value (specifically, the detection values of the A/F sensor 24 and the PM sensor 36) of the component amount of the reduction target component in exhaust from the injection start timing to the injection end timing.

The above-described embodiment produces the following effects.

The timing set unit 43 sets the injection timing in the second half of the compression stroke when the component amount of the reduction target component in exhaust gas detected by the exhaust gas sensor such as the A/F sensor 24 and the PM sensor 36 is equal to or greater than the predetermined value, on condition that the inside of the combustion chamber 21 of the internal combustion engine 10 satisfies the predetermined high temperature condition (on condition that the inside of the combustion chamber 21 is in the high temperature state in the second half of the compression stroke so that the reduction target component amount becomes less than the predetermined value). Therefore, implementation of fuel injection in the second half of the compression stroke consequently enables to restrict the reduction target component in exhaust from increasing.

The storage unit 44 stores, for each load and rotation speed of the internal combustion engine 10, the relationship between the injection implementation timing and the component amount of the reduction target component in exhaust gas at that time, as a map or a mathematical equation.

Specifically, the storage unit 44 stores, as the first component amount, the component amount of the reduction target component in exhaust gas when the injection implementation timing is in the second half of the compression stroke. Specifically, the storage unit 44 stores, as the second component amount, the component amount of the reduction target component in exhaust gas when the injection implementation timing is in the intake stroke or in the first half of the compression stroke. Then, the timing set unit 43 reads the first component amount and the second component amount with reference to the map stored in the storage unit 44. When the first component amount the second component amount, the injection timing is set in the second half of the compression stroke on condition that the inside of the combustion chamber 21 satisfies the predetermined high temperature condition. When the first component amount>the second component amount, the timing set unit 43 sets the injection timing in the intake stroke or the first half of the compression stroke. When fuel is actually injected into the internal combustion engine 10, this configuration makes comparison of the component amount of the predetermined reduction target component acquired by the exhaust gas sensor and selects the injection mode implemented for the internal combustion engine 10, thereby to enable to set the injection timing so that the reduction target component in exhaust gas can be further reduced.

The timing set unit 43 prohibits fuel injection in the second half of the compression stroke on condition that the component amount of the reduction target component in exhaust gas detected by the exhaust gas sensor during the fuel injection from the fuel injection valve 30 into the combustion chamber 21 in the second half of the compression stroke is equal to or greater than the predetermined value. In addition, the timing set unit 43 permits fuel injection in the second half of the compression stroke on condition that the component amount of the reduction target component in exhaust gas detected by the exhaust gas sensor when fuel is injected from the fuel injection valve 30 into the combustion chamber 21 in a stroke other than the second half of the compression stroke (for example, the intake stroke or the first half of the compression stroke) exceeds the predetermined value. Therefore, the configuration enables to switch the injection mode when the component amount of the reduction target component increases due to the selected injection mode. The configuration enables to select the injection mode that is more appropriate depending on the operating state of the internal combustion engine 10 in order to further reduce the reduction target component in exhaust gas.

The timing set unit 43 sets the fuel injection timing in the second half of the compression stroke of the internal combustion engine 10 on condition that the fuel pressure in the pressure accumulator 32 detected by the fuel pressure sensor 37 is equal to or higher than the predetermined value. This configuration enables to restrict injection of fuel at a low fuel pressure and thereby to restrict increase in the component amount of the reduction target component (for example, PM and unburned fuel) in exhaust gas due to enlarged droplets of fuel and insufficient vaporization.

When the injection timing of at least one of the split injections is set in the second half of the compression stroke of the internal combustion engine 10, the injection control unit 45 sets the amount of fuel injected in the second half of the compression stroke of the internal combustion engine 10 to be greater than the amount of fuel injected in a stroke other than the second half of the compression stroke of the internal combustion engine 10, on condition that the component amount of the reduction target component in exhaust gas detected by the A/F sensor 24, the PM sensor 36 and the like is equal to or greater than the predetermined value. When the amount of the reduction target component in exhaust gas is large, this configuration controls to increase the injection amount of fuel injected in the second half of the compression stroke and to implement fuel injection, thereby to enable to reduce the component amount of the reduction target component in exhaust gas according to the operating state of the internal combustion engine 10.

As above, the internal combustion engine 10, in which the port injection valve 31 and the direct injection type fuel injection valve 30 are provided together, has been described as an example. It is noted that, the internal combustion engine having only the direct injection type fuel injection valve 30 may be used.

The fuel injection control device of the present disclosure may be applied to a diesel engine as well as a gasoline engine. That is, the fuel injection control device may be applied to a fuel injection control device that controls a fuel injection valve of a direct injection diesel engine.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:

1. A fuel injection control device configured to control a fuel injection system, the fuel injection system including an accumulator configured to store high-pressure fuel, a fuel injection valve for direct injection configured to directly inject high-pressure fuel in the pressure accumulator into a combustion chamber of an internal combustion engine, and an exhaust gas sensor configured to detect a component in exhaust gas from the internal combustion engine, the fuel injection control device comprising:
a timing set unit configured to set a fuel injection timing in a second half of a compression stroke of the internal combustion engine, when a component amount of a reduction target component in exhaust gas detected by the exhaust gas sensor is greater than or equal to a predetermined value, on condition that the internal combustion engine satisfies a predetermined high temperature condition at a predetermined computation timing that is set for each combustion cycle of the internal combustion engine;
an injection control unit configured
to compute an injection period of fuel based on the injection timing that is set by the timing set unit and
to control the fuel injection valve based on the injection timing and the injection period; and
a determination unit configured to, after the timing set unit sets the fuel injection timing in the second half of the compression stroke and after fuel injection is implemented, determine whether the component amount of the reduction target component in exhaust gas detected by the exhaust gas sensor is equal to or greater than a predetermined threshold value, wherein
the timing set unit is configured to prohibit fuel injection in the second half of the compression stroke in response to determination of the determination unit that the component amount of the reduction target component in exhaust gas is equal to or greater than the predetermined threshold value.

2. The fuel injection control device according to claim 1, wherein
the time set unit is configured to prohibit injection of fuel in the second half of the compression stroke of the internal combustion engine, when the fuel injection valve injects fuel into the combustion chamber in the second half of the compression stroke of the internal combustion engine, on condition that the component amount of the reduction target component in exhaust gas detected by the exhaust gas sensor is greater than or equal to the predetermined value.

3. The fuel injection control device according to claim 1, further comprising:
a storage unit, wherein
the storage unit is configured, for each load and each speed of the internal combustion engine,
to store a first component amount that is a component amount of the reduction target component in exhaust gas detected by the exhaust gas sensor, when the fuel injection valve injects fuel into the combustion chamber in the second half of the compression stroke of the internal combustion engine, and to store a second component amount that is a component amount of the reduction target component in exhaust gas detected by the exhaust gas sensor, when the fuel injection valve injects fuel into the combustion chamber in a stroke other than the second half of the compression stroke of the internal combustion engine, and the time set unit is configured, for a predetermined load and a predetermined speed of the internal combustion engine, to compare the first component amount with the second component amount stored in the storage unit, to set the fuel injection timing in the second half of the compression stroke of the internal combustion engine, when the component amount of the first component is less than or equal to the component amount of the second component, and to set the fuel injection timing in a stroke other than the second half of the compression stroke of the internal combustion engine, when the component amount of the first component is greater than the component amount of the second component.

4. The fuel injection control device according to claim 1, wherein the time set unit is configured to permit fuel injection in the second half of the compression stroke of the internal combustion engine, when the component amount of the reduction target component in exhaust gas detected by the exhaust gas sensor is greater than the predetermined value, in a case where the fuel injection valve injects fuel into the combustion chamber in a stroke other than the second half of the compression stroke of the internal combustion engine.

5. The fuel injection control device according to claim 1, wherein the fuel injection system further includes a fuel pressure sensor configured to detect a fuel pressure in the accumulator, and the timing set unit is configured to set the fuel injection timing in the second half of the compression stroke of the internal combustion engine, on condition that the fuel pressure detected by the fuel pressure sensor is equal to or higher than a predetermined value.

6. The fuel injection control device according to claim 1, wherein the time set unit is configured to set the injection timing, so that a plurality of split injections are implemented during one combustion cycle of the internal combustion engine and to set the injection timing of last injection, which is implemented at an end of the plurality of split injections, in the second half of the compression stroke of the internal combustion engine.

7. The fuel injection control device according to claim 6, wherein the injection control unit is configured to set an amount of fuel injected in each of the plurality of split injections, so that the amount of fuel injected in the second half of the compression stroke of the internal combustion engine becomes larger than the amount of fuel injected in a stroke other than the second half of the compression stroke of the internal combustion engine, on condition that the component amount of the reduction target component in exhaust gas detected by the exhaust gas sensor is greater than or equal to a predetermined value.

8. The fuel injection control device according to claim 6, wherein the internal combustion engine further includes an ignition mechanism configured to ignite fuel in the combustion chamber, the timing set unit is configured to set the injection timing of the last injection to be implemented before ignition of fuel in the second half of the compression stroke, and the injection control unit is configured to control an injection condition of the last injection, so that a rich air-fuel mixture is formed around the ignition mechanism and stratified combustion occurs.

9. The fuel injection control device according to claim 1, wherein the internal combustion engine further includes a port injection valve configured to inject high-pressure fuel in the accumulator into an intake port of the internal combustion engine, and the time set unit is configured, when fuel is injected by using both the fuel injection valve and the port injection valve, to set an injection start timing of the port injection valve in a period that is after the intake valve of the internal combustion engine is closed in a combustion cycle of the internal combustion engine, which is immediately before, before an intake stroke of the current combustion cycle ends and to set an injection start timing of the fuel injection valve in the second half of the compression stroke of the present combustion cycle of the internal combustion engine.

10. The fuel injection control device according to claim 1, wherein the timing set unit is configured to permit fuel injection in the second half of the compression stroke in response to determination of the determination unit that the component amount of the reduction target component in exhaust gas is less than the predetermined threshold value.

11. The fuel injection control device according to claim 1, wherein the injection control unit is configured to set an amount of fuel injected in each of a plurality of split injections, so that the amount of fuel injected in the second half of the compression stroke of the internal combustion engine becomes larger than the amount of fuel injected in a stroke other than the second half of the compression stroke of the internal combustion engine.

12. The fuel injection control device according to claim 1, further comprising:

a fuel pressure set unit configured to set a target fuel pressure of a fuel pressure in the accumulator when the timing set unit sets the fuel injection timing in the second half of the compression stroke higher than a target fuel pressure of the fuel pressure when the timing set unit sets the fuel injection timing in a stroke other than the second half of the compression stroke.

\* \* \* \* \*